(12) United States Patent
Zhou et al.

(10) Patent No.: US 11,095,674 B2
(45) Date of Patent: Aug. 17, 2021

(54) DDOS ATTACK DETECTION METHOD AND DEVICE

(71) Applicant: HUAWEI TECHNOLOGIES CO., LTD., Shenzhen (CN)

(72) Inventors: Chong Zhou, Beijing (CN); Tienan Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 154 days.

(21) Appl. No.: 16/455,717

(22) Filed: Jun. 27, 2019

(65) Prior Publication Data
US 2019/0327255 A1 Oct. 24, 2019

Related U.S. Application Data

(63) Continuation of application No. PCT/CN2017/101338, filed on Sep. 12, 2017.

(30) Foreign Application Priority Data

Dec. 29, 2016 (CN) .......................... 201611243772.3

(51) Int. Cl.
H04L 29/06 (2006.01)
(52) U.S. Cl.
CPC ...... H04L 63/1425 (2013.01); H04L 63/1458 (2013.01); *H04L 2463/141* (2013.01)
(58) Field of Classification Search
CPC ............. H04L 63/1425; H04L 63/1458; H04L 2463/141
See application file for complete search history.

(56) References Cited

U.S. PATENT DOCUMENTS

| 8,134,934 B2 | 3/2012 | Chen et al. |
| 2002/0032774 A1 | 3/2002 | Kohler et al. |

(Continued)

FOREIGN PATENT DOCUMENTS

| CN | 101854341 A | 10/2010 |
| CN | 102394868 A | 3/2012 |

(Continued)

OTHER PUBLICATIONS

Laura Rettig • Mourad Khayati • Philippe Cudre-Mauroux • Michal Piorkowski; Online anomaly detection over Big Data streams; 2015 IEEE International Conference on Big Data (Big Data) (pp. 1113-1122); (Year: 2015).*

(Continued)

*Primary Examiner* — Luu T Pham
*Assistant Examiner* — Chao Wang
(74) *Attorney, Agent, or Firm* — Rimon PC

(57) ABSTRACT

This application discloses a distributed denial of service attack detection method. The method includes: obtaining a data stream sent to a protection object device in each detection period, obtaining total duration of each data stream; dividing each data stream into a long data stream or a short data stream based on the total duration of each data stream; adding, based on a detection period through which the long data stream goes, total data traffic of the long data stream to statistical traffic; adding data traffic of a short data stream in each detection period to the data traffic, of the long data stream, that is added to a corresponding detection period, to determine statistical traffic in each detection period; and if there is a detection period in which the statistical traffic exceeds a preset traffic threshold, determining that the protection object device undergoes a DDoS attack in the detection period.

12 Claims, 12 Drawing Sheets

(56) References Cited

U.S. PATENT DOCUMENTS

| | | | |
|---|---|---|---|
| 2006/0075489 A1* | 4/2006 | Ganguly | H04L 63/1458 |
| | | | 726/22 |
| 2012/0151583 A1 | 6/2012 | Kang et al. | |
| 2012/0163178 A1* | 6/2012 | Gordon | H04L 47/12 |
| | | | 370/237 |
| 2014/0082730 A1* | 3/2014 | Vashist | H04L 67/22 |
| | | | 726/23 |
| 2016/0080411 A1 | 3/2016 | Jain | |
| 2019/0124099 A1* | 4/2019 | Matselyukh | G06F 21/566 |

FOREIGN PATENT DOCUMENTS

| | | |
|---|---|---|
| JP | 2015111770 A | 6/2015 |
| WO | 0221279 A1 | 3/2002 |

OTHER PUBLICATIONS

S. Ganguly • M. Garofalakis • R. Rastogi • K. Sabnani; Streaming Algorithms for Robust, Real-Time Detection of DDoS Attacks; 27th International Conference on Distributed Computing Systems (ICDCS '07) (p. 4); (Year: 2007).*

Ying Huang • Xiangsheng Fu • Qiang Hou • Zifan Yu; The Early Detection of DDoS Based on the Persistent Increment Feature of the Traffic Volume; 22nd International Conference on Advanced Information Networking and Applications—Workshops (aina workshops 2008) (pp. 365-370); (Year: 2008).*

\* cited by examiner

DDOS ATTACK DETECTION METHOD AND DEVICE

CROSS-REFERENCE TO RELATED APPLICATIONS

This application is a continuation of International Application No. PCT/CN2017/101338, filed on Sep. 12, 2017, which claims priority to Chinese Patent Application No. 201611243772.3, filed on Dec. 29, 2016. The disclosures of the aforementioned applications are hereby incorporated by reference in their entireties.

TECHNICAL FIELD

This application relates to the field of Internet technologies, and in particular, to a distributed denial of service (DDoS) attack detection method and device.

BACKGROUND

A DDoS attack means that a plurality of computers are combined as an attack platform, and a large quantity of service resources are occupied in one or more target servers by using a proper service request, and consequently, an authorized user cannot obtain a service response from the server.

In an intrusion detection mechanism, a sampling device (for example, a router or a switch) collects information that arrives at a protection object device, and then sends the information to a sampling analysis server. The sampling analysis server regularly aggregates different data stream statistical data that arrives at a same protection object device, and determines, based on a statistical result of each detection period, whether the protection object device undergoes a DDoS attack. However, in a prior-art attack detection mechanism, data traffic reported to the sampling analysis server in a specific detection period may be a sum of traffic in a plurality of detection periods. However, because the sampling analysis server records the data traffic in traffic statistical data in a detection period corresponding to a reporting moment, data traffic that does not belong to the detection period is counted into the traffic statistical data in the detection period. Consequently, traffic in the detection period is excessively large, and a statistical result shown in FIG. 1 is obtained. Actually, the protection object device does not necessarily undergo the DDoS attack in a detection period with a relatively large statistical traffic value (for example, 15, 33, or 171). Consequently, attack detection accuracy is reduced because of inaccurate data statistics.

SUMMARY

A technical problem to be resolved in embodiments of this application is to provide a DDoS attack detection method and device, so that data statistics in each detection period is more accurate.

A first aspect of this application provides a DDoS attack detection method, including: obtaining, by a DDoS attack detection device, a data stream sent to a protection object device in each detection period, and obtaining total duration of each data stream; determining, based on the total duration of each data stream, whether each data stream is a long data stream or a short data stream; allocating, based on a detection period through which the long data stream goes, total data traffic of the long data stream to statistical traffic in each detection period through which the long data stream goes; adding data traffic of a short data stream in each detection period to data traffic of a long data stream allocated to a corresponding detection period, to determine the statistical traffic in each detection period; and if there is a detection period in which the statistical traffic exceeds a preset traffic threshold, determining that the protection object device undergoes a distributed denial of service DDoS attack in the detection period.

In the first aspect of an embodiment of this application, the data traffic of the short data stream in each detection period is added to the data traffic of the long data stream on which traffic compensation is performed, to obtain the statistical traffic and restore approximately actual traffic, so that data statistics in each detection period is more accurate, DDoS attack detection accuracy is improved, and a reporting error rate of DDoS attack detection is reduced.

With reference to the first aspect, in a first implementation of the first aspect, the allocating, based on a detection period through which the long data stream goes, total data traffic of the long data stream to statistical traffic in each detection period through which the long data stream goes includes: allocating, based on duration used by the long data stream to go through each detection period, the total data traffic of the long data stream to the statistical traffic in each detection period through which the long data stream goes. In this way, a traffic statistics result is more accurate.

With reference to the first aspect or the first implementation of the first aspect, in a second implementation of the first aspect, the method further includes: searching a current data traffic cache record for a data traffic record of the long data stream; and if the data traffic record of the long data stream exists in the current data traffic cache record, adding data traffic of the long data stream in a current storage period to data traffic of the long data stream in a historical storage period in a found current data traffic cache record, to determine the total data traffic of the long data stream. In this way, total data traffic of each long data stream is obtained more effectively, more properly, and more accurately, thereby reducing a statistics error.

With reference to the second implementation of the first aspect, in a third implementation of the first aspect, the method further includes: determining whether the long data stream is an active stream; and if the long data stream is the active stream, caching total data traffic of the data traffic of the long data stream in the current storage period and the data traffic of the long data stream in the historical storage period in the found current data traffic cache record; or if the long data stream is a non-active stream, performing cache clear on total data traffic of the data traffic of the long data stream in the current storage period and the data traffic of the long data stream in the historical storage period in the found current data traffic cache record. In this way, cache clear can be performed in time, thereby saving cache space.

With reference to the third implementation of the first aspect, in a fourth implementation of the first aspect, the determining whether the long data stream is an active stream includes: determining whether data traffic is continuously output from the long data stream at a preset active stream aging moment.

A second aspect of this application provides a DDoS attack detection device, including: a duration obtaining module, configured to: obtain a data stream sent to a protection object device in each detection period, and obtain total duration of each data stream; a data stream division module, configured to determine, based on the total duration of each data stream, whether each data stream is a long data stream or a short data stream; a traffic allocation module, configured to allocate, based on a detection period through which the long data stream goes, total data traffic of the long data stream to statistical traffic in each detection period through which the long data stream goes; a traffic statistics module, configured to add data traffic of a short data stream in each detection period to data traffic of a long data stream allocated to a corresponding detection period, to determine the statistical traffic in each detection period; and an attack determining module, configured to: if there is a detection period in which the statistical traffic exceeds a preset traffic threshold, determine that the protection object device undergoes a distributed denial of service DDoS attack in the detection period.

In the second aspect of this application, the data traffic of the short data stream in each detection period is added to the data traffic of the long data stream on which traffic compensation is performed, to obtain the statistical traffic and restore approximately actual traffic, so that data statistics in each detection period is more accurate, DDoS attack detection accuracy is improved, and a reporting error rate of DDoS attack detection is reduced.

With reference to the second aspect, in a first implementation of the second aspect, the traffic allocation module is specifically configured to allocate, based on duration used by the long data stream to go through each detection period, the total data traffic of the long data stream to the statistical traffic in each detection period through which the long data stream goes. In this way, a traffic statistics result is more accurate.

With reference to the second aspect or the first implementation of the second aspect, in a second implementation of the second aspect, the device further includes a record searching module, configured to: search a current data traffic cache record for a data traffic record of the long data stream; and if the data traffic record of the long data stream exists in the current data traffic cache record, add data traffic of the long data stream in a current storage period to data traffic of the long data stream in a historical storage period in a found current data traffic cache record, to determine the total data traffic of the long data stream. In this way, total data traffic of each long data stream is obtained more effectively, more properly, and more accurately, thereby reducing a statistics error.

With reference to the second implementation of the second aspect, in a third implementation of the second aspect, the device further includes an active stream determining module, configured to: determine whether the long data stream is an active stream; and if the long data stream is the active stream, cache total data traffic of the data traffic of the long data stream in the current storage period and the data traffic of the long data stream in the historical storage period in the found current data traffic cache record; or if the long data stream is a non-active stream, perform cache clear on total data traffic of the data traffic of the long data stream in the current storage period and the data traffic of the long data stream in the historical storage period in the found current data traffic cache record. In this way, cache clear can be performed in time, thereby saving cache space.

With reference to the third implementation of the second aspect, in a fourth implementation of the second aspect, that the active stream determining module determines whether the long data stream is the active stream is specifically configured to determine whether data traffic is continuously output from the long data stream at a preset active stream aging moment.

In a possible design, a structure of the DDoS attack detection device includes a processor and a transceiver. The processor is configured to perform the DDoS attack detection method provided in the first aspect of this application. Optionally, the DDoS attack detection device may further include a memory. The memory is configured to store application program code that supports the DDoS attack detection device in performing the foregoing method, and the processor is configured to execute an application program stored in the memory, to perform the following steps:

obtaining a data stream sent to a protection object device in each detection period, and obtaining total duration of each data stream;

determining, based on the total duration of each data stream, whether each data stream is a long data stream or a short data stream;

allocating, based on a detection period through which the long data stream goes, total data traffic of the long data stream to statistical traffic in each detection period through which the long data stream goes;

adding data traffic of a short data stream in each detection period to data traffic of a long data stream allocated to a corresponding detection period, to determine the statistical traffic in each detection period; and if there is a detection period in which the statistical traffic exceeds a preset traffic threshold, determining that the protection object device undergoes a DDoS attack in the detection period.

In a possible design, the allocating, based on a detection period through which the long data stream goes, total data traffic of the long data stream to statistical traffic in each detection period through which the long data stream goes includes: allocating, based on duration used by the long data stream to go through each detection period, the total data traffic of the long data stream to the statistical traffic in each detection period through which the long data stream goes.

In a possible design, the following steps are further included:

searching a current data traffic cache record for a data traffic record of the long data stream; and if the data traffic record of the long data stream exists in the current data traffic cache record, adding data traffic of the long data stream in a current storage period to data traffic of the long data stream in a historical storage period in a found current data traffic cache record, to determine the total data traffic of the long data stream.

In a possible design, the following steps are further included:

determining whether the long data stream is an active stream; and if the long data stream is the active stream, caching total data traffic of the data traffic of the long data stream in the current storage period and the data traffic of the long data stream in the historical storage period in the found current data traffic cache record; or if the long data stream is a non-active stream, performing cache clear on total data traffic of the data traffic of the long data stream in the current storage period and the data traffic of the long data stream in the historical storage period in the found current data traffic cache record.

In a possible design, the determining whether the long data stream is an active stream includes: determining whether data traffic is continuously output from the long data stream at a preset active stream aging moment.

DESCRIPTION OF EMBODIMENTS

The following describes the technical solutions in the embodiments of this application with reference to the accompanying drawings in the embodiments of this application.

In the specification, claims, and accompanying drawings of this application, the terms such as "first", "second", "third", and "fourth" are intended to distinguish between different objects, but do not indicate a particular order. In addition, the terms such as "include", "contain", and any other variant thereof are intended to cover non-exclusive inclusion. For example, a process, a method, a system, a product, or a device that includes a series of steps or units is not limited to the listed steps or units, but optionally further includes a step or unit that is not listed, or optionally further includes another step or unit inherent to the process, the method, the product, or the device.

"Embodiment" mentioned in the specification means that a particular characteristic, structure, or feature described with reference to the embodiment may be included in at least one embodiment of this application. The word occurring at various locations in the specification does not necessarily refer to a same embodiment, and is not an independent or optional embodiment exclusive of another embodiment. It is explicitly and implicitly understood by a person skilled in the art that the embodiment described in the specification may be combined with another embodiment.

Figure 2:
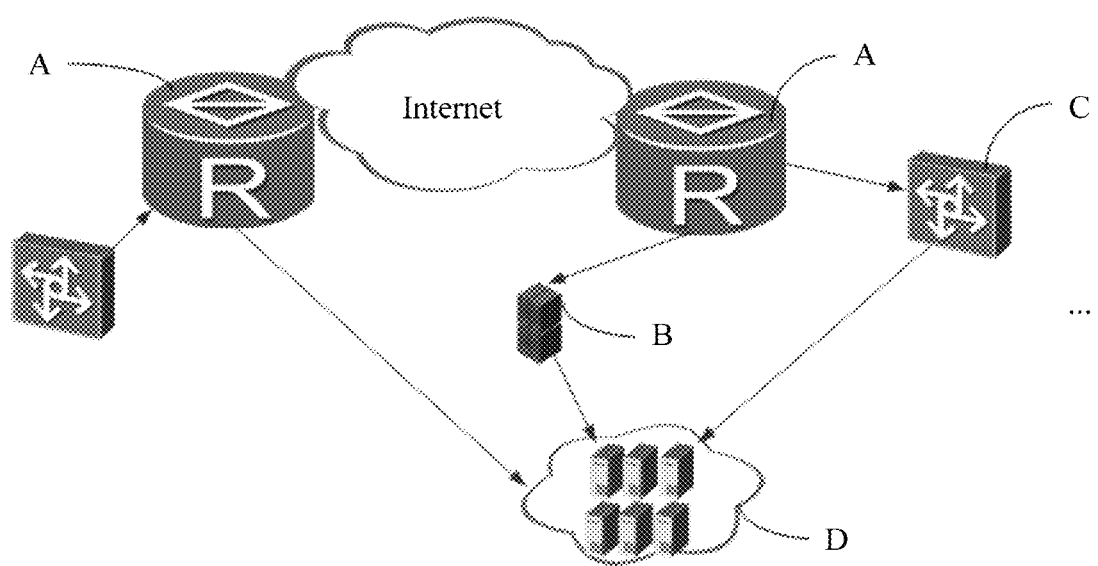
FIG. 2 is a schematic structural diagram of DDoS attack detection networking according to an embodiment of this application.

In the embodiments of this application, a protection object device may be an object used to receive a data stream, for example, a website, a server, a data center, or a network segment (a network domain). A data stream is sent by a source device to the protection object device (a destination device). When the source device sends the data stream to the protection object device, a sampling device collects the data stream and then sends the data stream to a DDoS attack detection device. The sampling device may be a network forwarding device such as a router or a switch, or may be a server that receives a data stream split from the network forwarding device and extracts a sampling data stream. The DDoS attack detection device may be a sampling analysis server. Certainly, the sampling analysis server may also be replaced with a sampling analysis server cluster. A process of implementing the solutions of the embodiments of this application is described in the following embodiment by using the "sampling analysis server" as an example. The DDoS attack detection device is usually deployed in a network, and receives a sampling data stream. Specifically, as shown in FIG. 2, network devices A, B, and C are all sampling devices, and a network device D is a DDoS attack detection device. In a sampling manner, the network device A is a router, and a router A samples a data stream forwarded by the router A, and sends the data stream to a sampling analysis server D. In another sampling manner, the network device B is a server. A server B has no forwarding function, but only extracts a sampling data stream. The router A copies a data stream forwarded to the network device C, and then sends the data stream to the server B. In another sampling manner, the network device C is a switch, and a switch C samples a data stream forwarded by the switch C, and provides the data stream for a sampling analysis device D. After obtaining a sampling data stream, the sampling devices A, B, and C send the sampling data stream to the sampling analysis server D. After obtaining data traffic of a long data stream sent to the protection object device, the sampling analysis server D correspondingly allocates the data stream to each detection period through which the long data stream goes, to perform traffic compensation on the long data stream. In this way, statistical traffic of a short data stream in each detection period is added to the data traffic of the long data stream on which compensation is performed, to restore approximately actual traffic, so that data statistics in each detection period is more accurate, DDoS attack detection accuracy is improved, and a reporting error rate of DDoS attack detection is reduced.

In addition, network traffic sampling in the embodiments of this application is a statistics and release technology based on network stream information. A corresponding traffic sampling protocol usually includes two versions: NetFlow and IPFIX (IP Flow Information Export, IP Flow Information Export), and the IPFIX is a latest IETF standard based on the NetFlow. The embodiments of this application are described below with reference to the accompanying drawings by using an example of a safe DDoS attack detection scenario based on IPFIX stream sampling.

Figure 3:
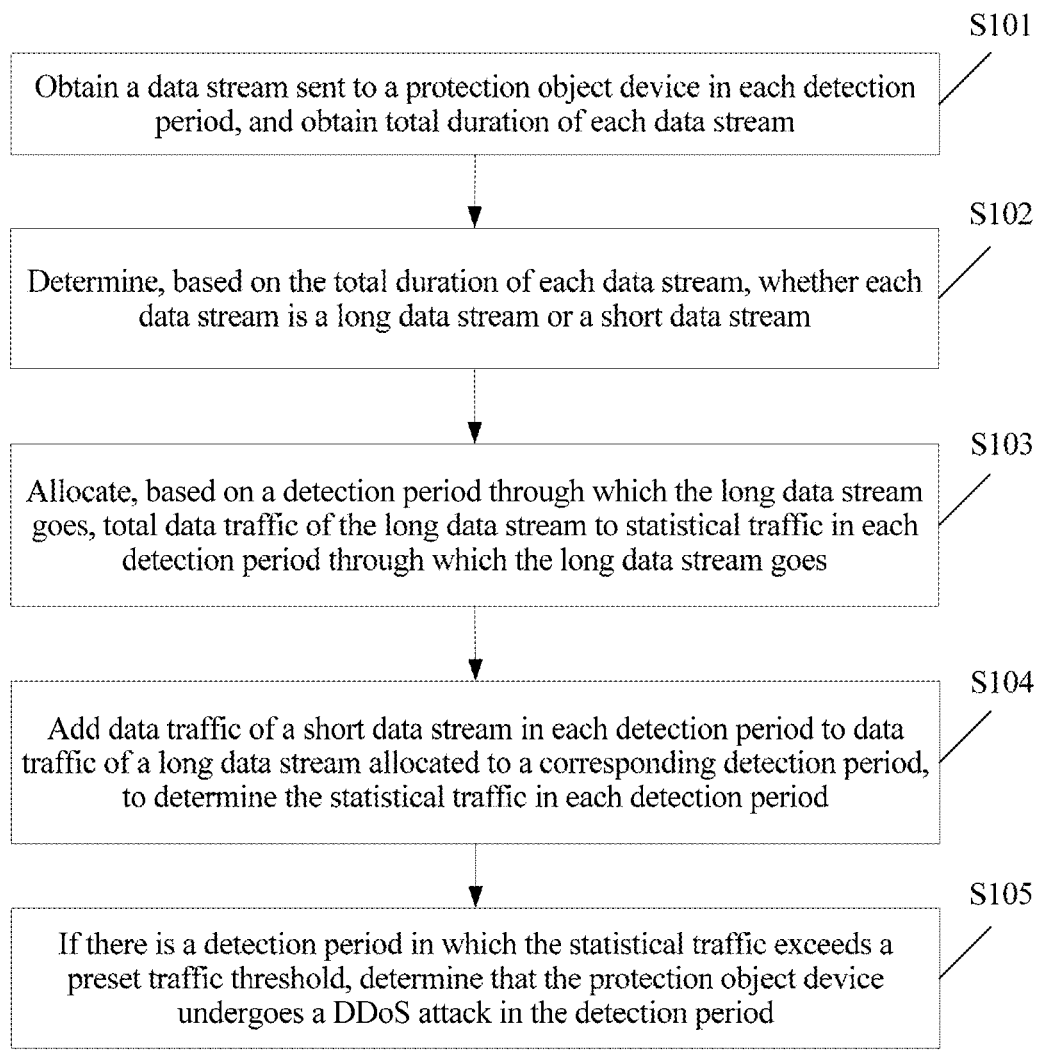
FIG. 3 is a schematic flowchart of a DDoS attack detection method according to an embodiment of this application.

Referring to FIG. 3, FIG. 3 is a schematic flowchart of a DDoS attack detection method according to an embodiment of this application. A DDoS attack detection device end is mainly described. The method includes the following steps.

S101. Obtain a data stream sent to a protection object device in each detection period, and obtain total duration of each data stream.

Figure 4:
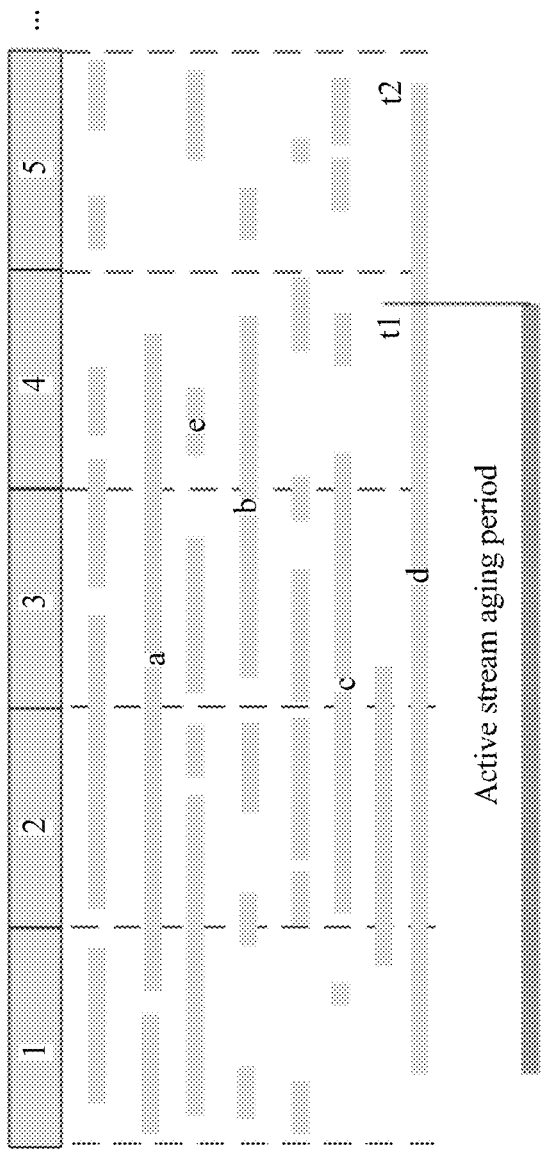
FIG. 4 is a schematic diagram of an interface of a received data stream in each detection period according to an embodiment of this application.

Specifically, the detection period is a statistical period that is preset in the DDoS attack detection device and that is obtained after an IPFIX sampling data stream is received, and is usually set to 2 minutes. As shown in FIG. 4, FIG. 4 shows a status of a data stream that arrives at a protected website, namely, a status of a data stream reported by a sampling device to the DDoS attack detection device, and 1, 2, 3, 4, and 5 are preset detection periods. After receiving an IPFIX data stream (for example, data streams a, b, c, d, and e) reported by the sampling device in each detection period, the DDoS attack detection device obtains information about the IPFIX data stream, for example, an IPFIX data stream start moment, an IPFIX data stream end moment, total duration (duration from the stream start moment to the stream end moment), and total data traffic. A moment at which the sampling device reports a data stream includes a stream end moment and an active stream aging moment. In addition, total data traffic of each data stream belongs to statistical traffic in a detection period corresponding to a reporting moment. For example, b starts in a detection period 3 and ends in a detection period 4. In this case, after b is correspondingly reported in the detection period 4, total data traffic of b is counted into statistical traffic in the detection period 4. Therefore, statistical traffic, in each detection period, shown in FIG. 1 may be obtained based on such the statistical result.

In specific implementation, after collecting the data stream sent to the protection object device, the sampling device reports the data stream to the DDoS attack detection device at the data stream end moment or the active stream aging moment. The DDoS attack detection device extracts information such as total duration and total data traffic of the received data stream.

S102. Determine, based on the total duration of each data stream, whether each data stream is a long data stream or a short data stream.

Specifically, when the total duration of the data stream is greater than preset duration of the detection period, it is determined that the data stream is the long data stream, and when the total duration of the data stream is less than or equal to the preset duration of the detection period, it is determined that the data stream is the short data stream.

For example, as shown in FIG. 4, if each preset detection period is 2 minutes, and total duration of a, b, c, d (a moment t1), and e are respectively 6 minutes, 3.2 minutes, 4 minutes, 7 minutes, and 0.6 minutes, it is determined that a, b, c, and d are long data streams, and e is a short data stream.

Step S103. Allocate, based on a detection period through which the long data stream goes, total data traffic of the long data stream to statistical traffic in each detection period through which the long data stream goes.

Specifically, the traffic of the long data stream is allocated to each detection period through which the data stream goes. As shown in FIG. 4, a goes through periods 1, 2, 3, and 4. Because a ends in the period 4, total data traffic of a reported in the period 4 is separately allocated to the periods 1, 2, 3, and 4. A specific allocation manner may be allocating, based on duration used by the long data stream to go through each detection period, the total data traffic of the long data stream to the statistical traffic in each detection period through which the long data stream goes.

For example, as shown in FIG. 4, a long stream a is used as an example. If total data traffic obtained when a is output in the period 4 is 32, and a ratio of duration separately used by a to go through the periods 1, 2, 3, and 4 is 3:10:10:9, the total data traffic 32 of a is separately allocated to the periods 1, 2, 3, and 4 with respective amounts of traffic: 3, 10, 10, and 9.

S104. Add data traffic of a short data stream in each detection period to data traffic of a long data stream allocated to a corresponding detection period, to determine the statistical traffic in each detection period.

Specifically, the statistical traffic in each detection period includes data traffic of a long data stream reported in the period and data traffic of a short data stream reported in the period. The data traffic of the long data stream reported in the period is some allocated data traffic.

Figure 5:
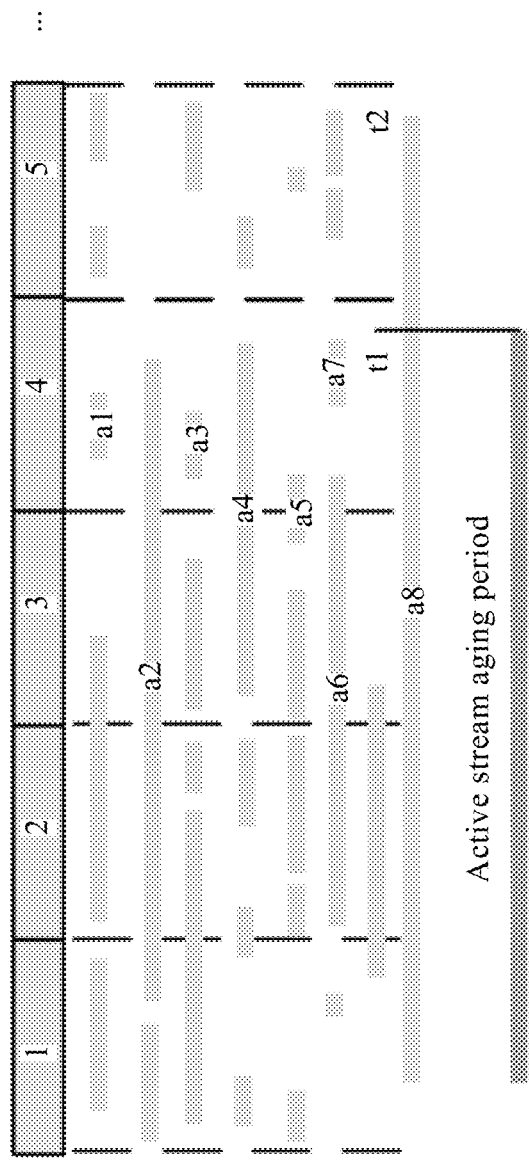
FIG. 5 is another schematic diagram of an interface of a received data stream in each detection period according to an embodiment of this application.

For example, as shown in FIG. 5, FIG. 5 is a schematic diagram of a data stream that arrives at a protection object device. A data stream output in the detection period 4 includes a1 to a8, a1, a3, a5, and a7 are short data streams, and a2, a4, a6, and a8 are long data streams. Data traffic of a1, a3, a5, and a7 is added to data traffic of a data stream that is in a2, a4, a6, and a8 and that is allocated to the detection period 4, to obtain statistical traffic in the detection period.

Figure 1:
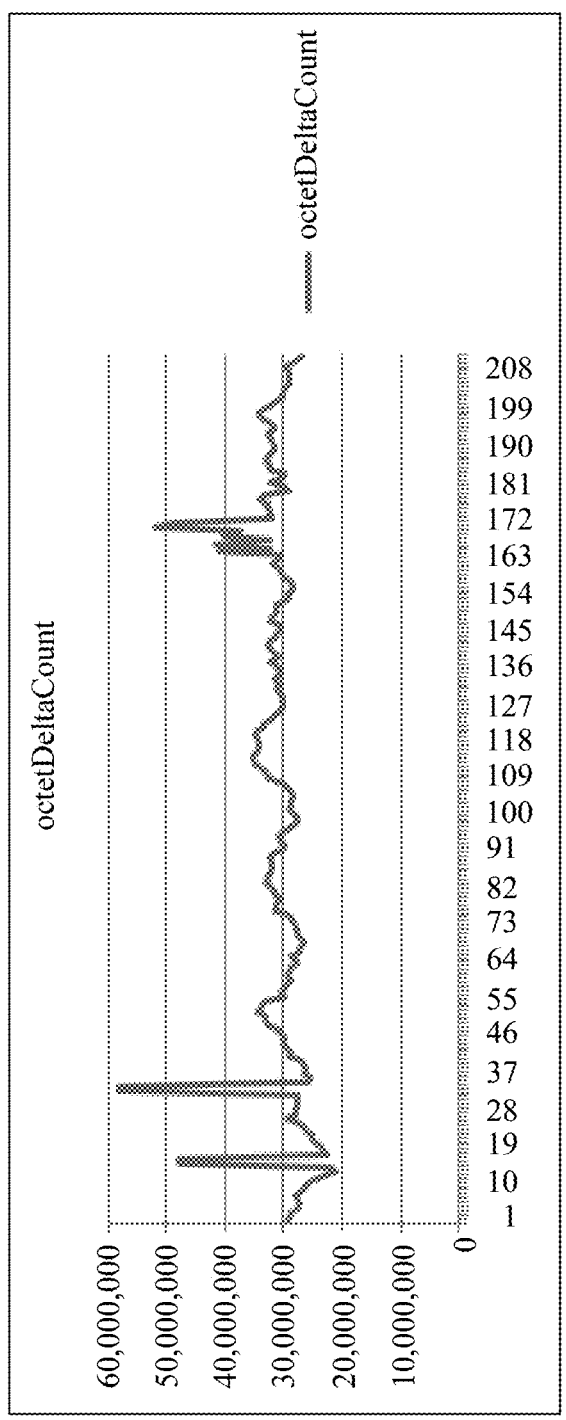
FIG. 1 is a schematic diagram of an interface of actual statistical traffic of a protection object device according to an embodiment of this application.
Figure 6:
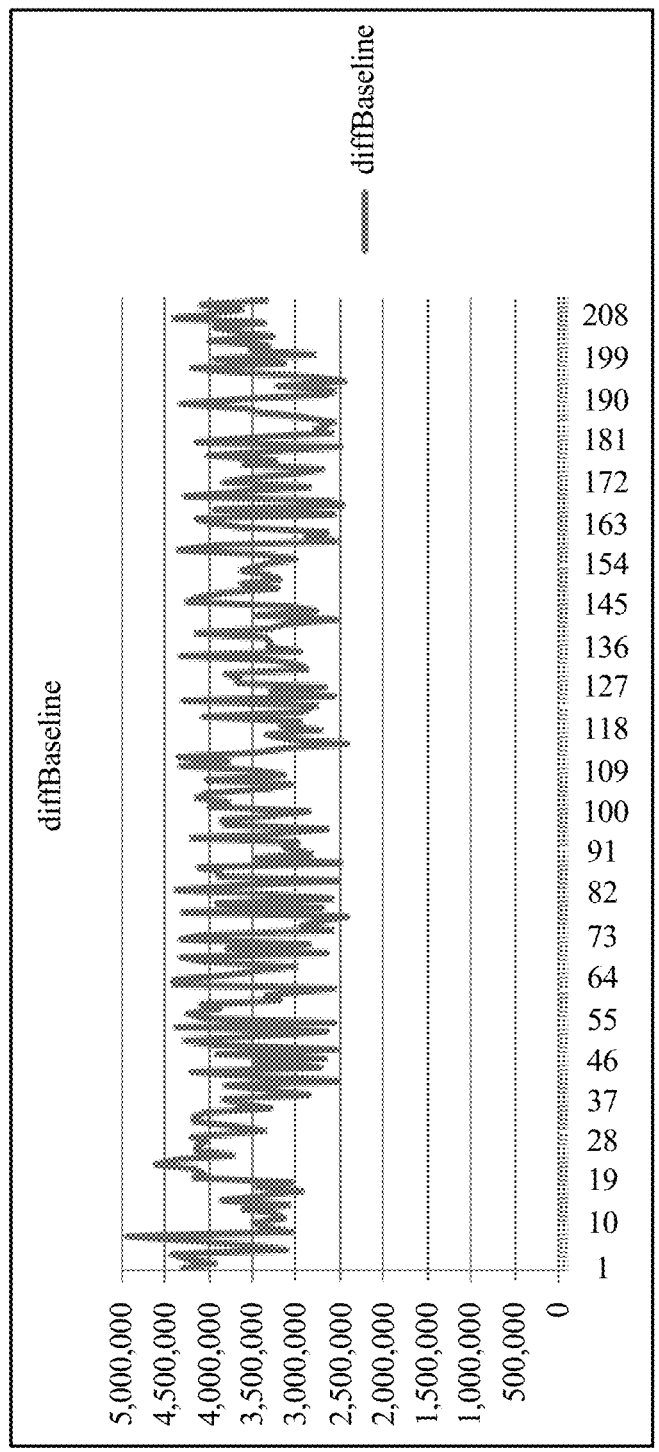
FIG. 6 is a schematic diagram of an interface of a compensation baseline of a long data stream according to an embodiment of this application.
Figure 7:
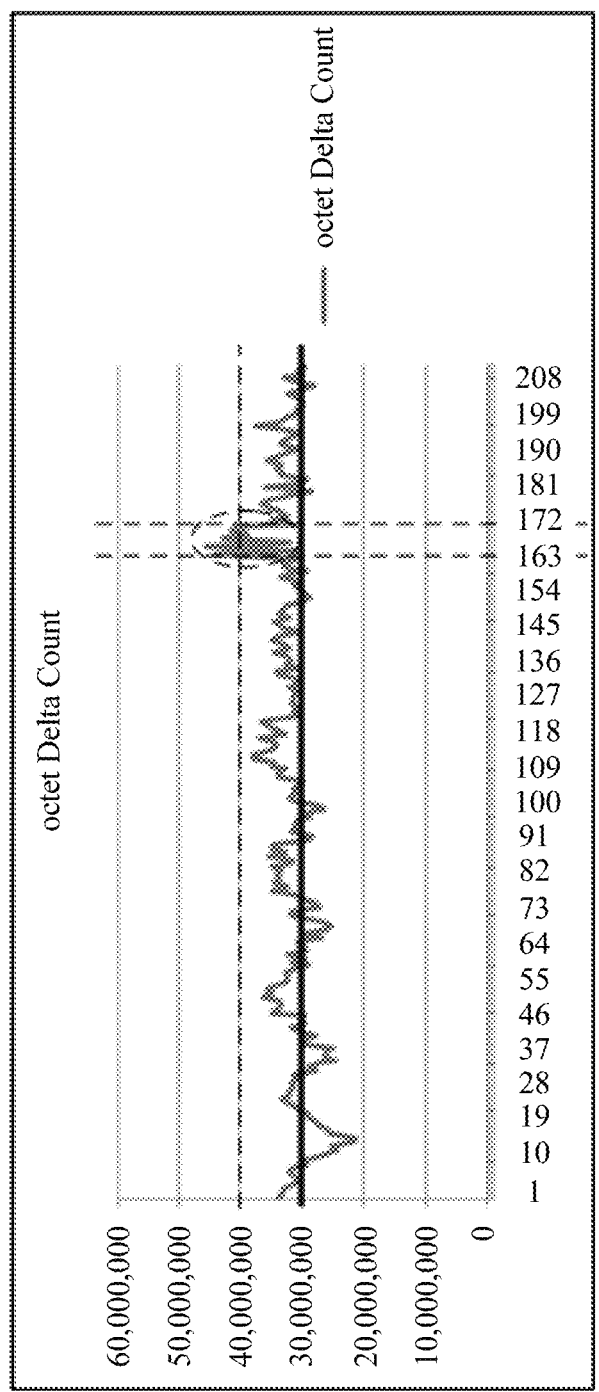
FIG. 7 is a schematic diagram of an interface of statistical traffic obtained after compensation is performed on a long data stream according to an embodiment of this application.

Corresponding to FIG. 1, a statistical traffic value is relatively large in detection periods 15, 33, and 171. Data traffic of long data streams in these detection periods is allocated, to obtain a schematic diagram of a compensation baseline of a long data stream shown in FIG. 6. Data traffic obtained after the data traffic of the long data streams in FIG. 1 is removed is correspondingly added to data traffic in FIG. 6, to obtain a diagram of statistical traffic, in each detection period, on which compensation is performed, which is shown in FIG. 7. The corresponding addition may be performed based on a period, or may be performed based on a moment. This is not specifically limited herein.

Step S105. If there is a detection period in which the statistical traffic exceeds a preset traffic threshold, determine that the protection object device undergoes a distributed denial of service DDoS attack in the detection period.

Specifically, if the addition is performed based on the period, data traffic, in each detection period, on which compensation is performed is compared with a preset traffic threshold. If a difference falls beyond a preset range, it is determined that the protection object device undergoes the DDoS attack in the detection period. Further, if the addition is performed based on the moment, when a difference between data traffic at a specific moment and the preset traffic threshold falls beyond a preset range, it is determined that the protection object device undergoes the DDoS attack at the moment.

For example, as shown in FIG. 7, assuming that the preset traffic threshold is 40000000, it is determined, through comparative analysis, that the protection object device undergoes the DDoS attack in detection periods 165 to 172.

In this embodiment of this application, the DDoS attack detection device collects statistics about data traffic of a long data stream received by the protection object device, and correspondingly allocates the statistical traffic to a detection period through which the data stream goes, to perform traffic compensation on the long data stream. In this way, statistical traffic of a short data stream in each detection period is added to data traffic of the long data stream on which compensation is performed, to restore approximately actual traffic, so that data statistics in each detection period is more accurate, DDoS attack detection accuracy is improved, and a reporting error rate of DDoS attack detection is reduced.

Figure 8A:
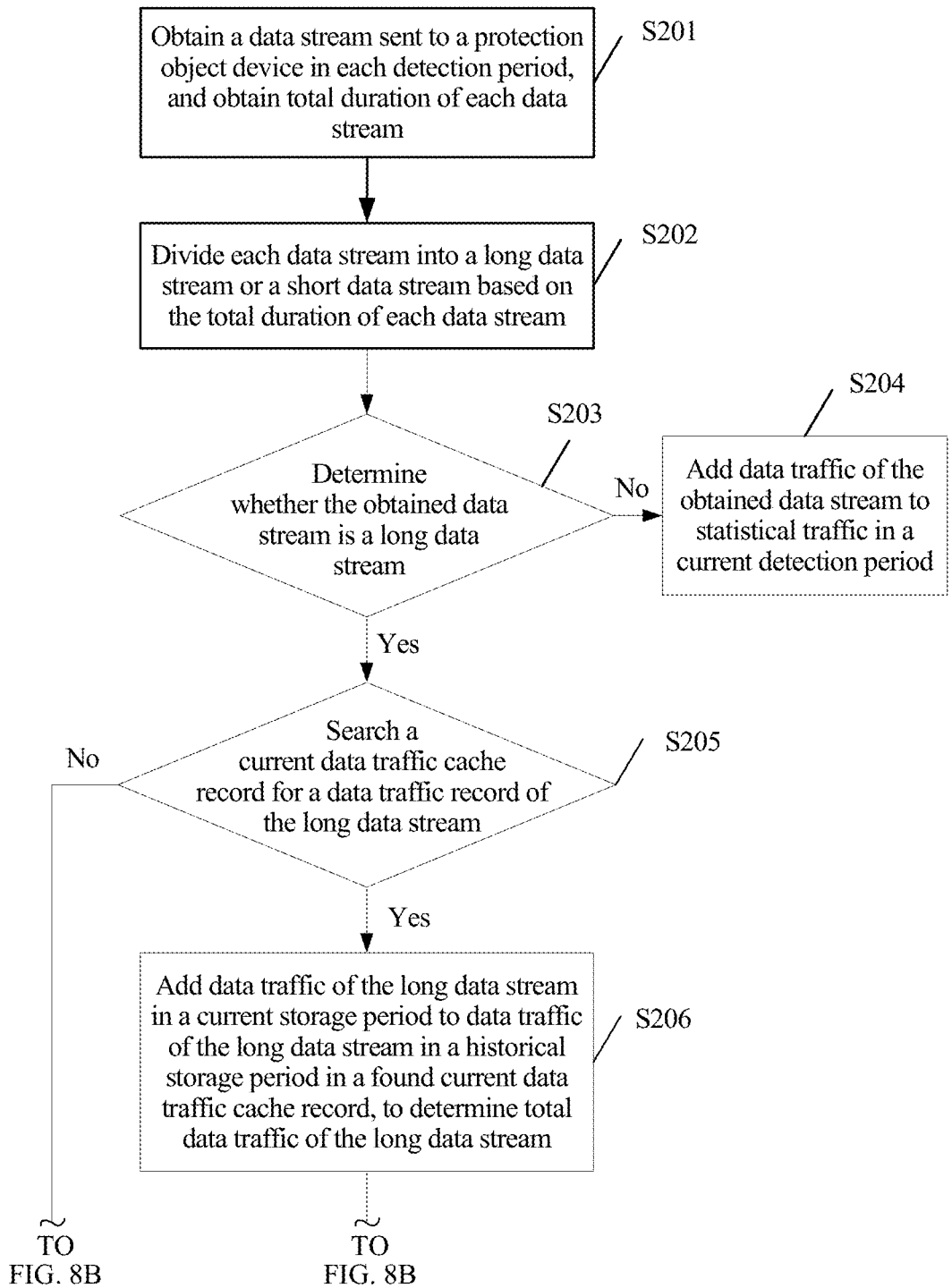
FIG. 8A and FIG. 8B are a schematic flowchart of a DDoS attack detection method according to another embodiment of this application.
Figure 8B:
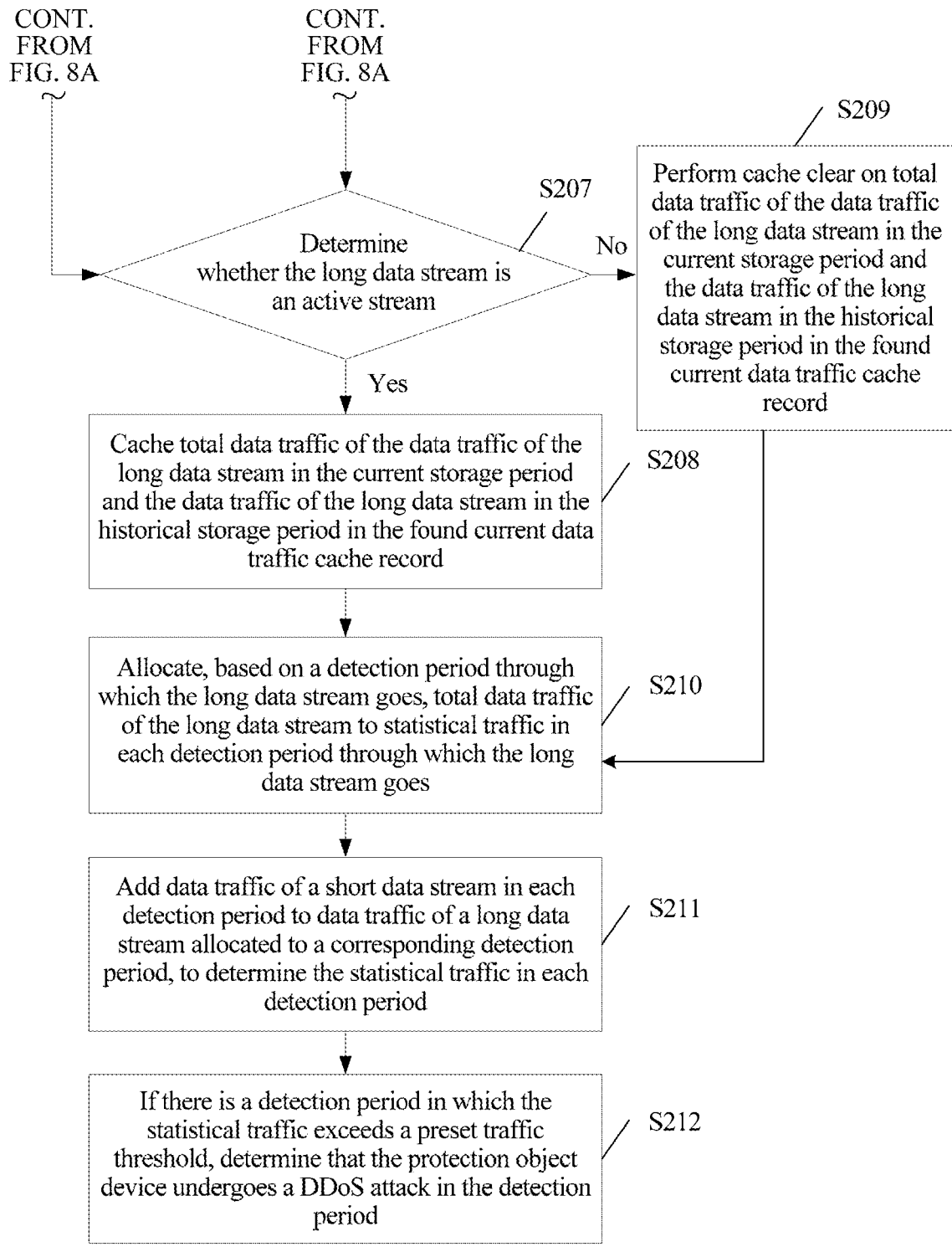

Referring to FIG. 8A and FIG. 8B, FIG. 8A and FIG. 8B are a schematic flowchart of a DDoS attack detection method according to another embodiment of this application. The method includes the following steps.

S201. Obtain a data stream sent to a protection object device in each detection period, and obtain total duration of each data stream.

Specifically, the detection period is a statistical period that is preset in a DDoS attack detection device and that is obtained after a sampling data stream is received, and is usually set to 2 minutes. As shown in FIG. 4, FIG. 4 shows a status of a data stream that arrives at a protected website, namely, a status of a data stream reported by a sampling device to the DDoS attack detection device, and 1, 2, 3, 4, and 5 are preset detection periods. After receiving a data stream (for example, data streams a, b, c, d, and e) reported by the sampling device in each detection period, the DDoS attack detection device obtains information about the data stream, for example, a stream start moment, a stream end moment, total duration (duration from the stream start moment to the stream end moment), and total data traffic. A moment at which the sampling device reports a data stream includes a stream end moment and an active stream aging moment. In addition, total data traffic of each data stream belongs to statistical traffic in a detection period corresponding to a reporting moment. For example, b starts in a detection period 3 and ends in a detection period 4. In this case, after b is correspondingly reported in the detection period 4, total data traffic of b is counted into statistical traffic in the detection period 4. Therefore, statistical traffic, in each detection period, shown in FIG. 1 may be obtained based on such the statistical result.

In specific implementation, after collecting the data stream sent to the protection object device, the sampling device reports the data stream to the DDoS attack detection device at the data stream end moment or the active stream aging moment. The DDoS attack detection device extracts information such as total duration and total data traffic of the received data stream.

S202. Divide each data stream into a long data stream or a short data stream based on the total duration of each data stream.

Specifically, when the total duration of the data stream is greater than preset duration of the detection period, it is determined that the data stream is the long data stream, and when the total duration of the data stream is less than or equal to the preset duration of the detection period, it is determined that the data stream is the short data stream.

For example, as shown in FIG. 4, if each preset detection period is 2 minutes, and total duration of a, b, c, d (a moment t1), and e are respectively 6 minutes, 3.2 minutes, 4 minutes, 7 minutes, and 0.6 minutes, it is determined that a, b, c, and d are long data streams, and e is a short data stream.

S203. Determine whether the obtained data stream is a long data stream.

S204. If the obtained data stream is a short data stream, add data traffic of the obtained data stream to statistical traffic in a current detection period.

S205. If the obtained data stream is the long data stream, search a current data traffic cache record for a data traffic record of the long data stream.

Specifically, the data traffic cache record is a record of caching the data stream when duration of the data stream is relatively long and a plurality of storage periods are spanned. As shown in Table 1, the cache record may be a table of mapping between a data stream and data traffic.

TABLE 1

| Data stream | Data traffic |
|---|---|
| Stream 1 | 50 |
| Stream 2 | 32 |
| Stream 3 | 100 |
| Stream 4 | 88 |

The data stream may be determined by using a data stream identifier. If a communication packet between data streams includes an IP 2-tuple, the data stream identifier may include one or more of a source IP address and a destination IP address. If the communication packet between the data streams includes an IP 5-tuple, the data stream identifier may include one or more of a source IP, a destination IP, a protocol number, a source port number, and a destination port number.

In addition, the storage period may be an active stream aging period or a detection period. To be specific, when the DDoS attack detection device receives a long data stream, if data traffic is continuously output from the long data stream at a preset active stream aging moment, the DDoS attack detection device determines that the long data stream is an active stream, and adds the data stream to the cache record at the active stream aging moment. Alternatively, when each detection period ends, the DDoS attack detection device determines whether a data stream in the detection period is a long stream, and if yes, adds the long data stream to the cache record.

S206. If the data traffic record of the long data stream exists in the current data traffic cache record, add data traffic of the long data stream in a current storage period to data traffic of the long data stream in a historical storage period in a found current data traffic cache record, to determine total data traffic of the long data stream.

Figure 9:
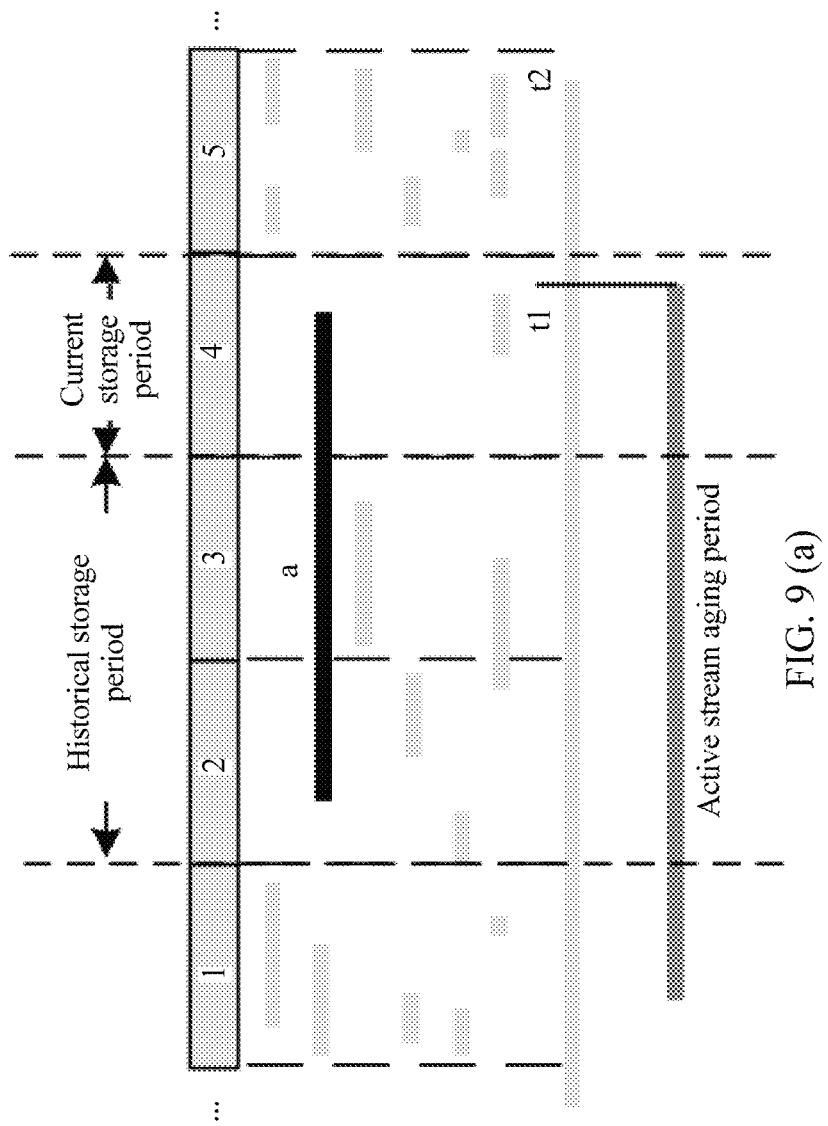
FIG. 9(a) is a schematic diagram of an interface of a storage period according to an embodiment of this application.
FIG. 9(b) is a schematic diagram of an interface of another storage period according to an embodiment of this application.
Figure 9:
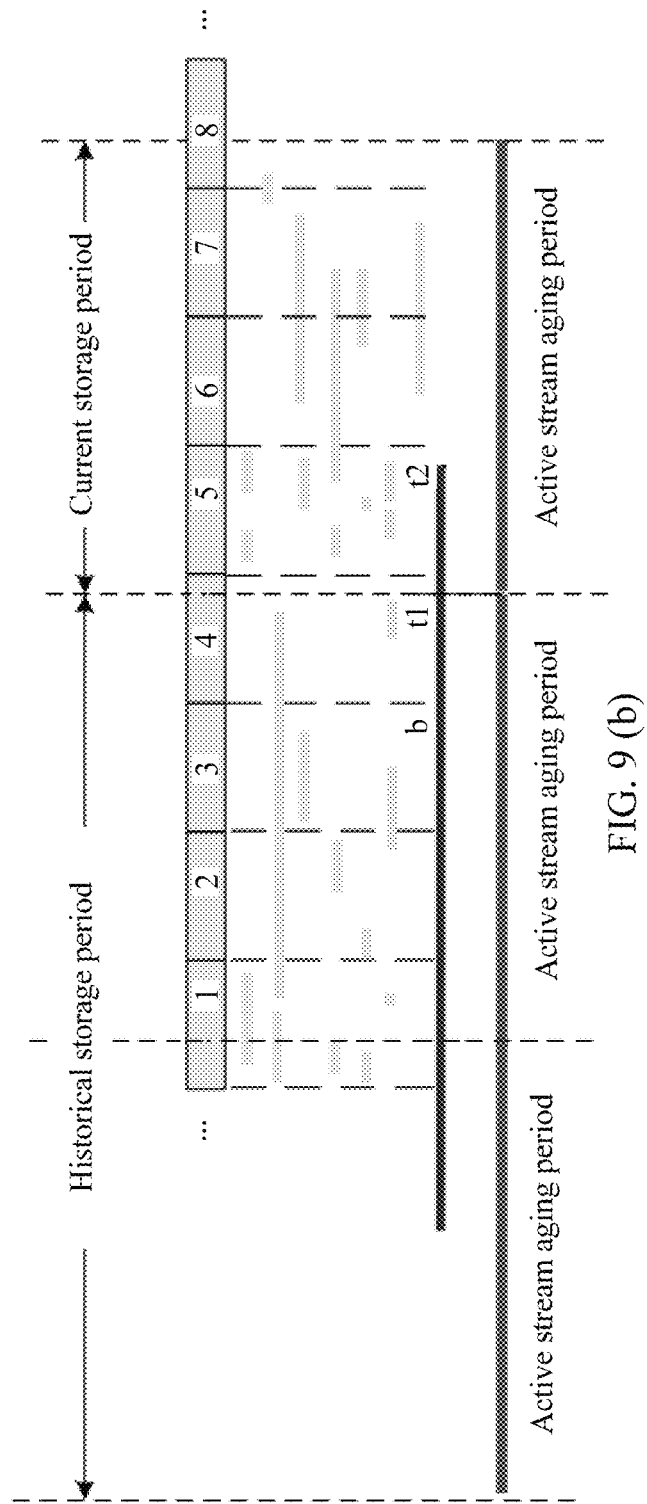

For example, as shown in FIG. 9(a), a detection period is a storage period. For a, if a ends in a period 4, the period 4 is the current storage period. Traffic is continuously output from a in periods 2 and 3, and the traffic exists in the cache record. Therefore, the periods 2 and 3 are historical storage periods. Therefore, total data traffic of a is a sum of traffic in the current storage period and traffic in the historical storage periods.

As shown in FIG. 9(b), an active stream aging period is a storage period. For b, if the stream ends at a moment t2, a time period from t1 to t2 is the current storage period, and a time period from a moment at which the stream starts to the moment t1 is the historical storage period. Data traffic in the current storage period is added to data traffic in the historical storage period, to obtain total data traffic of b.

S207. Determine whether the long data stream is an active stream.

Specifically, it is determined whether data traffic is continuously output from the long data stream at a preset active stream aging moment. As shown in FIG. 4, if data traffic is continuously output from a long data stream d at an active stream aging period t1, d is an active stream; otherwise, d is a non-active stream.

S208. If the long data stream is the active stream, cache total data traffic of the data traffic of the long data stream in the current storage period and the data traffic of the long data stream in the historical storage period in the found current data traffic cache record.

S209. If the long data stream is a non-active stream, perform cache clear on total data traffic of the data traffic of the long data stream in the current storage period and the data traffic of the long data stream in the historical storage period in the found current data traffic cache record.

S210. Allocate, based on a detection period through which the long data stream goes, total data traffic of the long data stream to statistical traffic in each detection period through which the long data stream goes.

Specifically, the traffic of the long data stream is allocated to each detection period through which the data stream goes. As shown in FIG. 4, a goes through periods 1, 2, 3, and 4. Because a ends in the period 4, total data traffic of a reported in the period 4 is separately allocated to the periods 1, 2, 3, and 4. A specific allocation manner may be allocating, based on duration used by the long data stream to go through each detection period, the total data traffic of the long data stream to the statistical traffic in each detection period through which the long data stream goes.

For example, as shown in FIG. 4, a long stream a is used as an example. If total data traffic obtained when a is output in the period 4 is 32, and a ratio of duration separately used by a to go through the periods 1, 2, 3, and 4 is 3:10:10:9, the total data traffic 32 of a is separately allocated to the periods 1, 2, 3, and 4 with respective amounts of traffic: 3, 10, 10, and 9.

S211. Add data traffic of a short data stream in each detection period to data traffic of a long data stream allocated to a corresponding detection period, to determine the statistical traffic in each detection period.

Specifically, the statistical traffic in each detection period includes data traffic of a long data stream reported in the period and data traffic of a short data stream reported in the period. The data traffic of the long data stream is some allocated data traffic.

For example, as shown in FIG. 5, FIG. 5 is a schematic diagram of a data stream that arrives at a protection object device. A data stream output in the detection period 4 includes a1 to a8, a1, a3, a5, and a7 are short data streams, and a2, a4, a6, and a8 are long data streams. Data traffic of a1, a3, a5, and a7 is added to data traffic of a data stream that is in a2, a4, a6, and a8 and that is allocated to the detection period 4, to obtain statistical traffic in the detection period.

Corresponding to FIG. 1, a statistical traffic value is relatively large in detection periods 15, 33, and 171. Data traffic of long data streams in these detection periods is allocated, to obtain a schematic diagram of a compensation baseline of a long data stream shown in FIG. 6. Data traffic obtained after the data traffic of the long data streams in FIG. 1 is removed is correspondingly added to data traffic in FIG. 6, to obtain a diagram of statistical traffic, in each detection period, on which compensation is performed, which is shown in FIG. 7. The corresponding addition may be performed based on a period, or may be performed based on a moment. This is not specifically limited herein.

S212. If there is a detection period in which the statistical traffic exceeds a preset traffic threshold, determine that the protection object device undergoes a distributed denial of service DDoS attack in the detection period.

Specifically, if the addition is performed based on the period, data traffic, in each detection period, on which compensation is performed is compared with a preset traffic threshold. If a difference falls beyond a preset range, it is determined that the protection object device undergoes the DDoS attack in the detection period. Further, if the addition is performed based on the moment, when a difference between data traffic at a specific moment and the preset traffic threshold falls beyond a preset range, it is determined that the protection object device undergoes the DDoS attack at the moment.

For example, as shown in FIG. 7, assuming that the preset traffic threshold is 40000000, it is determined, through comparative analysis, that the protection object device undergoes the DDoS attack in detection periods 165 to 172.

In this embodiment of this application, the DDoS attack detection device collects statistics about data traffic of a long data stream received by the protection object device, and correspondingly allocates the statistical traffic to a detection period through which the data stream goes, to perform traffic compensation on the long data stream. In this way, statistical traffic of a short data stream in each detection period is added to data traffic of the long data stream on which compensation is performed, to restore approximately actual traffic, so that data statistics in each detection period is more accurate, DDoS attack detection accuracy is improved, and a reporting error rate of DDoS attack detection is reduced.

Figure 10:
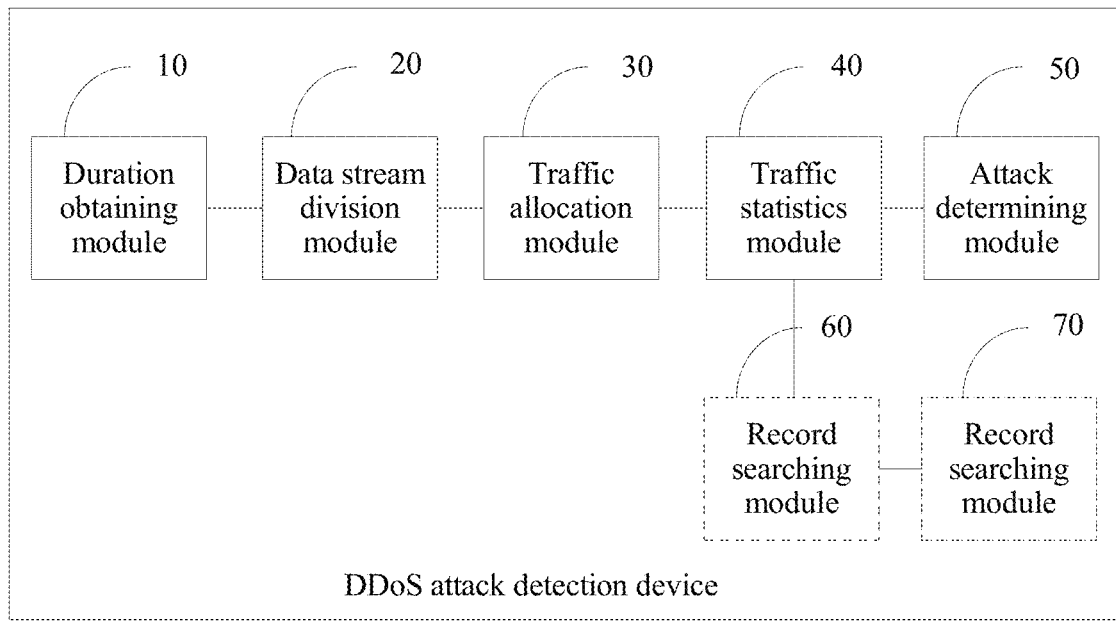
FIG. 10 is a schematic structural diagram of a DDoS attack detection device according to an embodiment of this application.

Referring to FIG. 10, FIG. 10 is a schematic structural diagram of a DDoS attack detection device according to an embodiment of this application. As shown in FIG. 10, the device includes a duration obtaining module 10, a data stream division module 20, a traffic allocation module 30, a traffic statistics module 40, and an attack determining module 50.

The duration obtaining module 10 is configured to: obtain a data stream sent to a protection object device in each detection period, and obtain total duration of each data stream. The duration obtaining module 10 may be implemented by using software or hardware. For example, the duration obtaining module 10 may be a timer. Specifically, the detection period is a statistical period that is preset in the DDoS attack detection device and that is obtained after a sampling data stream is received, and is usually set to 2 minutes. As shown in FIGS. 4, 1, 2, 3, 4, and 5 are preset detection periods. The DDoS attack detection device receives a data stream (for example, data streams a, b, c, d, and e) sent by a sampling device in each detection period, and obtains information about the data stream, for example, a stream start moment, a stream end moment, and total duration. A moment at which the sampling device reports a data stream includes a stream end moment and an active stream aging moment. In addition, total data traffic of each data stream belongs to statistical traffic in a detection period corresponding to a reporting moment. For example, b starts in a detection period 3 and ends in a detection period 4. In this case, after b is correspondingly reported in the detection period 4, total data traffic of b is counted into statistical traffic in the detection period 4. Therefore, statistical traffic, in each detection period, shown in FIG. 1 may be obtained based on such the statistical result.

In specific implementation, after collecting the data stream sent to the protection object device, the sampling device reports the data stream to the DDoS attack detection device at the data stream end moment or the active stream aging moment. The DDoS attack detection device extracts information such as total duration and total data traffic of the received data stream.

The data stream division module 20 is configured to divide each data stream into a long data stream or a short data stream based on the total duration of each data stream. The data stream division module 20 may be a packet classifier. The data stream division module 20 may also be implemented by using other software or hardware. Specifically, when the total duration of the data stream is greater than preset duration of the detection period, it is determined that the data stream is the long data stream, and when the total duration of the data stream is less than or equal to the preset duration of the detection period, it is determined that the data stream is the short data stream. For example, as shown in FIG. 4, if each preset detection period is 2 minutes, and total duration of a, b, c, d (a moment t1), and e are respectively 6 minutes, 3.2 minutes, 4 minutes, 7 minutes, and 0.6 minutes, it is determined that a, b, c, and d are long data streams, and e is a short data stream.

The traffic allocation module 30 is configured to allocate, based on a detection period through which the long data stream goes, total data traffic of the long data stream to statistical traffic in each detection period through which the long data stream goes. The traffic allocation module 30 may be implemented by using a hardware circuit such as a selector or a scheduler. Specifically, the traffic of the long data stream is allocated to each detection period through which the data stream goes. As shown in FIG. 4, a goes through periods 1, 2, 3, and 4, and total data traffic of a is allocated to the periods 1, 2, 3, and 4.

The traffic allocation module 30 is specifically configured to allocate, based on duration used by the long data stream to go through each detection period, the total data traffic of the long data stream to the statistical traffic in each detection period through which the long data stream goes.

For example, as shown in FIG. 4, a long stream a is used as an example. If total data traffic obtained when a is output in the period 4 is 32, and a ratio of duration separately used by a to go through the periods 1, 2, 3, and 4 is 3:10:10:9, the total data traffic 32 of a is separately allocated to the periods 1, 2, 3, and 4 with respective amounts of traffic: 3, 10, 10, and 9.

The traffic statistics module 40 is configured to add data traffic of a short data stream in each detection period to data traffic of a long data stream allocated to a corresponding detection period, to determine the statistical traffic in each detection period. The traffic statistics module 40 may be a counter. Specifically, the statistical traffic in each detection period includes data traffic of a long data stream reported in the period and data traffic of a short data stream reported in the period. The data traffic of the long data stream is some allocated data traffic. For example, as shown in FIG. 5, FIG. 5 is a schematic diagram of a data stream that arrives at a protection object device. A data stream output in the detection period 4 includes a1 to a8, a1, a3, a5, and a7 are short data streams, and a2, a4, a5, and a8 are long streams. Data traffic of a1, a3, a5, and a7 is added to traffic of a data stream that is in a2, a4, a5, and a8 and that is allocated to the detection period 4, to obtain statistical traffic in the detection period. Corresponding to FIG. 1, a statistical traffic value is relatively large in detection periods 15, 33, and 171. Data traffic of long data streams in these detection periods is allocated, to obtain a schematic diagram of a compensation baseline of a long data stream shown in FIG. 6. Data traffic obtained after the data traffic of the long data streams in FIG. 1 is removed is correspondingly added to data traffic in FIG. 6, to obtain a diagram of statistical traffic, in each detection period, on which compensation is performed, which is shown in FIG. 7. The corresponding addition may be performed based on a period, or may be performed based on a moment. This is not specifically limited herein.

The attack determining module 50 is configured to: if there is a detection period in which the statistical traffic exceeds a preset traffic threshold, determine that the protection object device undergoes a distributed denial of service DDoS attack in the detection period. Specifically, if the addition is performed based on the period, data traffic, in each detection period, on which compensation is performed is compared with a preset traffic threshold. If a difference falls beyond a preset range, it is determined that the protection object device undergoes the DDoS attack in the detection period. Further, if the addition is performed based on the moment, when a difference between data traffic at a specific moment and the preset traffic threshold falls beyond a preset range, it is determined that the protection object device undergoes the DDoS attack at the moment.

For example, as shown in FIG. 7, assuming that the preset traffic threshold is 40000000, it is determined, through comparative analysis, that the protection object device undergoes the DDoS attack in detection periods 165 to 172.

Optionally, as shown in FIG. 10, the DDoS attack detection device further includes a record searching module 60. The record searching module 60 is configured to: search a current data traffic cache record for a data traffic record of the long data stream; and if the data traffic record of the long data stream exists in the current data traffic cache record, add data traffic of the long data stream in a current storage period to data traffic of the long data stream in a historical storage period in a found current data traffic cache record, to determine the total data traffic of the long data stream.

Specifically, the storage period may be an active stream aging period or a detection period. To be specific, when the DDoS attack detection device receives a long data stream, if data traffic is continuously output from the long data stream at a preset active stream aging moment, the DDoS attack detection device determines that the long data stream is an active stream, and adds the data stream to the cache record at the active stream aging moment. Alternatively, when each detection period ends, the DDoS attack detection device determines whether a data stream in the detection period is a long stream, and if yes, adds the long data stream to the cache record.

As shown in FIG. 9(a), a detection period is a storage period. For a, if a ends in a period 4, the period 4 is the current storage period. Traffic is continuously output from a in periods 2 and 3, and the traffic exists in the cache record. Therefore, the periods 2 and 3 are historical storage periods. Therefore, total data traffic of a is a sum of traffic in the current storage period and traffic in the historical storage periods.

As shown in FIG. 9(b), an active stream aging period is a storage period. For b, if the stream ends at a moment t2, a time period from t1 to t2 is the current storage period, and a time period from a moment at which the stream starts to the moment t1 is the historical storage period. Data traffic in the current storage period is added to data traffic in the historical storage period, to obtain total data traffic of b.

Optionally, as shown in FIG. 10, the DDoS attack detection device further includes an active stream determining module 70. The active stream determining module 70 is configured to: determine whether the long data stream is an active stream; and if the long data stream is the active stream, cache total data traffic of the data traffic of the long data stream in the current storage period and the data traffic of the long data stream in the historical storage period in the found current data traffic cache record; or if the long data stream is a non-active stream, perform cache clear on total data traffic of the data traffic of the long data stream in the current storage period and the data traffic of the long data stream in the historical storage period in the found current data traffic cache record.

That the active stream determining module 70 determines whether the long data stream is an active stream specifically includes: determining whether data traffic is continuously output from the long data stream at a preset active stream aging moment; and if the data traffic is continuously output from the long data stream at the preset active stream aging moment, determining that the long data stream is the active stream; or if no data traffic is continuously output from the long data stream at the preset active stream aging moment, determining that the long data stream is a non-active stream.

In this embodiment of this application, the DDoS attack detection device collects statistics about data traffic of a long data stream received by the protection object device, and correspondingly allocates the statistical traffic to a detection period through which the data stream goes, to perform traffic compensation on the long data stream. In this way, statistical traffic of a short data stream in each detection period is added to data traffic of the long data stream on which compensation is performed, to restore approximately actual traffic, so that data statistics in each detection period is more accurate, DDoS attack detection accuracy is improved, and a reporting error rate of DDoS attack detection is reduced.

Figure 11:
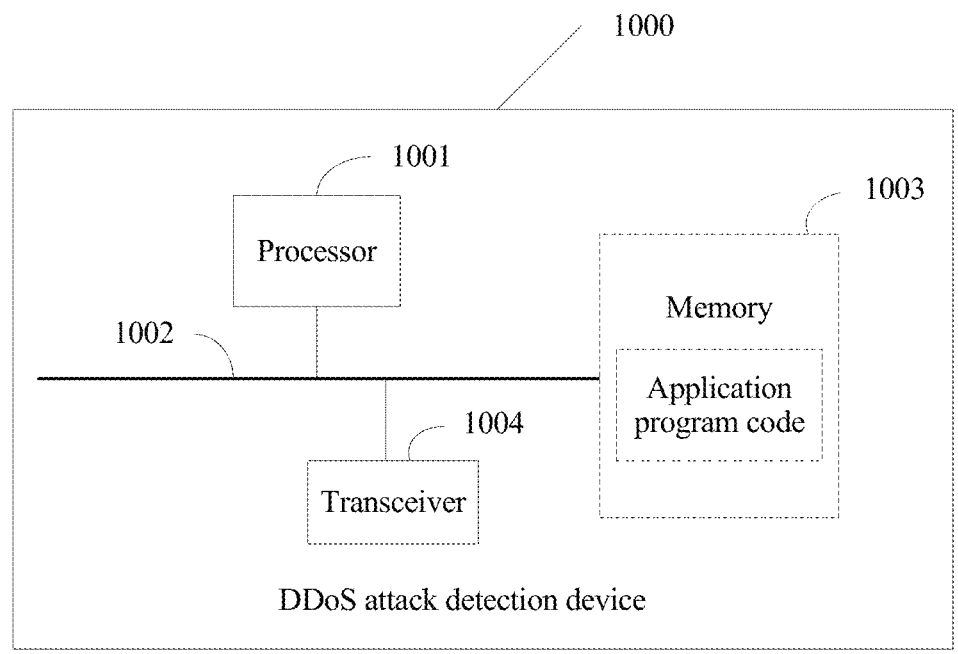
FIG. 11 is a schematic structural diagram of another DDoS attack detection device according to an embodiment of this application.

The DDoS attack detection device in the embodiment shown in FIG. 10 may be implemented by a DDoS attack detection device shown in FIG. 11. As shown in FIG. 11, FIG. 11 is a schematic structural diagram of a DDoS attack detection device according to an embodiment of this application. The DDoS attack detection device 1000 shown in FIG. 11 includes a processor 1001 and a transceiver 1004. The processor 1001 and the transceiver 1004 are connected, for example, by using a bus 1002. Optionally, the DDoS attack detection device 1000 may further include a memory 1003. It should be noted that in actual application, a quantity of transceivers 1004 is not limited to 2. A structure of the DDoS attack detection device 1000 does not constitute a limitation on this embodiment of this application.

The processor 1001 is applied to this embodiment of this application, and is configured to implement functions of the data stream division module 20, the traffic allocation module 30, the traffic statistics module 40, and the attack determining module 50 shown in FIG. 10. The transceiver 1004 includes a receiver and a transmitter. The transceiver 1004 is applied to this embodiment of this application, and is configured to implement a function of the duration obtaining module 10 shown in FIG. 10.

The processor 1001 may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware device, or any combination thereof. The processor 1001 may implement or execute various example logical blocks, modules, and circuits described with reference to content disclosed in this application. Alternatively, the processor 1001 may be a combination of processors implementing a computing function, for example, a combination of one or more microprocessors or a combination of the DSP and a microprocessor.

The bus 1002 may include a channel for transmitting information between the foregoing components. The bus 1002 may be a PCI bus, an EISA bus, or the like. The bus 1002 may be classified into an address bus, a data bus, a control bus, and the like. For ease of representation, the bus is represented by using only one bold line in FIG. 10, but this does not mean that there is only one bus or only one type of bus.

The memory 1003 may be a ROM or a static storage device of another type that can store static information and instructions, or a RAM or a dynamic storage device of another type that can store information and instructions, or may be an EEPROM, a CD-ROM, or other compact disc storage or optical disc storage (including a compressed optical disc, a laser disc, an optical disc, a digital versatile disc, a Blu-ray optical disc, and the like), a magnetic disk storage medium or another magnetic storage device, or any other medium capable of carrying or storing expected program code in a form of instructions or data structures and capable of being accessed by a computer, but is not limited thereto.

Optionally, the memory 1003 is configured to store application program code for executing the solutions of this application, and the processor 1001 controls execution of the solutions of this application. The processor 1001 is configured to execute the application program code stored in the memory 1003, to implement actions of the DDoS attack detection device provided in any one of the embodiments shown in FIG. 3 and FIG. 8A and FIG. 8B.

An embodiment of this application further provides a computer storage medium, configured to store a computer software instruction used by the foregoing data receiving apparatus. The computer software instruction includes a program designed for the data receiving apparatus to execute the foregoing aspects.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with another hardware, or may also use another allocation form, such as by using the Internet or another wired or wireless telecommunications system.

This application is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A distributed denial of service (DDoS) attack detection method, comprising:
    obtaining a data stream sent to a protection object device in each detection period, and obtaining a total duration of each data stream;
    determining, based on the total duration of each data stream, whether each data stream is a long data stream or a short data stream, wherein a total duration of the long data stream is greater than a duration of the detection period and a total duration of a short data stream is less than or equal to the detection period, wherein the data streams includes a first long data stream and a first short data stream;
    allocating, based on a detection period through which the first long data stream lasts, total data traffic of the first long data stream to statistical traffic in each detection period through which the first long data stream lasts, wherein the detection period through which the first long data stream lasts comprises a duration used by the first long data stream to go through each detection period;
    adding data traffic of a short data stream in each detection period to data traffic of a long data stream allocated to a corresponding detection period, to determine the statistical traffic in each detection period, wherein data traffic of the first short data stream is added to data traffic of the first long data only in the detection period the short data stream lasts; and
    if there is a detection period in which the statistical traffic exceeds a preset traffic threshold, determining that the protection object device underlasts a DDoS attack in the detection period.

2. The method according to claim 1, further comprising:
    searching a current data traffic cache record for a data traffic record of the first long data stream; and
        if the data traffic record of the first long data stream exists in the current data traffic cache record, adding data traffic of the first long data stream in a current storage period to data traffic of the first long data stream in a historical storage period in a found current data traffic cache record, to determine the total data traffic of the first long data stream.

3. The method according to claim 2, further comprising:
    determining whether the first long data stream is an active stream; and
    if the first long data stream is an active stream, caching total data traffic of the data traffic of the first long data stream in the current storage period and the data traffic of the first long data stream in the historical storage period in the found current data traffic cache record; or
    if the first long data stream is a non-active stream, performing cache clear on total data traffic of the data traffic of the first long data stream in the current storage period and the data traffic of the first long data stream in the historical storage period in the found current data traffic cache record.

4. The method according to claim 3, wherein the determining whether the first long data stream is an active stream comprises:
    determining whether data traffic is continuously output from the first long data stream at a preset active stream aging moment.

5. A distributed denial of service (DDoS) attack detection device, comprising:
    a memory comprising instructions; and
    a processor in communications with the memory, the instructions causing the processor to:
        obtain a data stream sent to a protection object device in each detection period, and obtain a total duration of each data stream;
        determine, based on the total duration of each data stream, whether each data stream is a long data stream or a short data stream, wherein a total duration of the long data stream is greater than a duration of the detection period and a total duration of a short data stream is less than or equal to the detection period, wherein the data streams includes a first long data stream and a first short data stream;
        allocate, based on a detection period through which the first long data stream lasts, total data traffic of the first long data stream to statistical traffic in each detection period through which the first long data stream lasts, wherein the detection period through which the first long data stream lasts comprises a duration used by the first long data stream to go through each detection period;
        add data traffic of a short data stream in each detection period to data traffic of a long data stream allocated to a corresponding detection period, to determine the statistical traffic in each detection period, wherein data traffic of the first short data stream is added to data traffic of the first long data only in the detection period the short data stream lasts; and
        if there is a detection period in which the statistical traffic exceeds a preset traffic threshold, determine that the protection object device underlasts a DDoS attack in the detection period.

6. The DDoS attack detection device according to claim 5, wherein the instructions further cause the processor to:
    search a current data traffic cache record for a data traffic record of the first long data stream; and if the data traffic record of the first long data stream exists in the current data traffic cache record, add data traffic of the first long data stream in a current storage period to data traffic of the first long data stream in a historical storage period in a found current data traffic cache record, to determine the total data traffic of the first long data stream.

7. The DDoS attack detection device according to claim 6, wherein the instructions further cause the processor to:
    determine whether the first long data stream is an active stream; and if the first long data stream is an active stream, cache total data traffic of the data traffic of the first long data stream in the current storage period and the data traffic of the first long data stream in the historical storage period in the found current data traffic cache record; or if the first long data stream is a non-active stream, perform cache clear on total data traffic of the data traffic of the first long data stream in the current storage period and the data traffic of the first long data stream in the historical storage period in the found current data traffic cache record.

8. The DDoS attack detection device according to claim 7, wherein the instructions further cause the processor to:
    determine whether data traffic is continuously output from the first long data stream at a preset active stream aging moment.

9. A non-transitory computer-readable storage medium comprising instructions that, when the instructions executed by a computer, cause the computer to carry out:
    obtain a data stream sent to a protection object device in each detection period, and obtain a total duration of each data stream;
    determine, based on the total duration of each data stream, whether each data stream is a long data stream or a short data stream, wherein a total duration of the long data stream is greater than a duration of the detection period and a total duration of a short data stream is less than or equal to the detection period, wherein the data streams includes a first long data stream and a first short data stream;
    allocate, based on a detection period through which the first long data stream lasts, total data traffic of the first long data stream to statistical traffic in each detection period through which the first long data stream lasts, wherein the detection period through which the first long data stream lasts comprises a duration used by the first long data stream to go through each detection period;
    add data traffic of a short data stream in each detection period to data traffic of a long data stream allocated to a corresponding detection period, to determine the statistical traffic in each detection period, wherein data traffic of the first short data stream is added to data traffic of the first long data only in the detection period the short data stream lasts; and
    if there is a detection period in which the statistical traffic exceeds a preset traffic threshold, determine that the protection object device is under a DDoS attack in the detection period.

10. The non-transitory computer-readable storage medium according to claim 9, wherein when the instructions executed by a computer, the instructions cause the computer to carry out:
    search a current data traffic cache record for a data traffic record of the first long data stream; and if the data traffic record of the first long data stream exists in the current data traffic cache record, add data traffic of the first long data stream in a current storage period to data traffic of the first long data stream in a historical storage period in a found current data traffic cache record, to determine the total data traffic of the first long data stream.

11. The non-transitory computer-readable storage medium according to claim 10, wherein when the instructions executed by a computer, the instructions cause the computer to carry out:
    determine whether the first long data stream is an active stream; and if the first long data stream is the active stream, cache total data traffic of the data traffic of the first long data stream in the current storage period and the data traffic of the first long data stream in the historical storage period in the found current data traffic cache record; or if the first long data stream is a non-active stream, perform cache clear on total data traffic of the data traffic of the first long data stream in the current storage period and the data traffic of the first long data stream in the historical storage period in the found current data traffic cache record.

12. The non-transitory computer-readable storage medium according to claim 11, wherein when the instructions executed by a computer, the instructions cause the computer to carry out:
    determine whether data traffic is continuously output from the first long data stream at a preset active stream aging moment.

* * * * *